(12) United States Patent
Jarrett

(10) Patent No.: US 7,592,030 B2
(45) Date of Patent: Sep. 22, 2009

(54) NON-DAIRY, NON-SOY FOOD PRODUCT AND METHODS OF MAKING

(75) Inventor: Rose Anne Jarrett, Oxford, NJ (US)

(73) Assignee: Green Rabbit, LLC, Albany, NY (US)

( * ) Notice: Subject to any disclaimer, the term of this patent is extended or adjusted under 35 U.S.C. 154(b) by 561 days.

(21) Appl. No.: 11/071,077

(22) Filed: Mar. 3, 2005

(65) Prior Publication Data

US 2006/0198937 A1 Sep. 7, 2006

(51) Int. Cl.
 *A23L 1/38* (2006.01)
(52) U.S. Cl. .................. 426/629; 426/100; 426/518; 426/519; 426/524; 426/632; 426/639
(58) Field of Classification Search .............. 426/629, 426/632, 639, 100, 524, 518, 519, 426, 589
See application file for complete search history.

(56) References Cited

U.S. PATENT DOCUMENTS

| | | | | |
|---|---|---|---|---|
| 2,511,119 | A | * | 6/1950 | Mitchell, Jr. ............... 426/633 |
| 2,984,543 | A | * | 5/1961 | Smith et al. ................ 423/268 |
| 4,244,981 | A | | 1/1981 | Blake |
| 4,335,155 | A | | 6/1982 | Blake et al. |
| 4,368,211 | A | | 1/1983 | Blake et al. |
| 4,609,561 | A | | 9/1986 | Wade et al. |
| 4,643,906 | A | | 2/1987 | Pitz |
| 4,744,992 | A | | 5/1988 | Mitchell et al. |
| 4,800,097 | A | * | 1/1989 | Morris et al. ............... 426/632 |
| 4,894,242 | A | | 1/1990 | Mitchell et al. |
| 4,908,223 | A | | 3/1990 | Murtaugh et al. |
| 4,948,614 | A | | 8/1990 | Feldpausch |
| 5,059,442 | A | | 10/1991 | Klemann et al. |
| 5,084,295 | A | | 1/1992 | Whelan et al. |
| 5,098,731 | A | | 3/1992 | Feldpausch |
| RE34,508 | E | | 1/1994 | Murtaugh et al. |
| 6,010,734 | A | | 1/2000 | Whelan et al. |
| 6,197,362 | B1 | | 3/2001 | Hussein |
| 6,368,653 | B1 | | 4/2002 | Heerje et al. |
| 6,376,002 | B1 | | 4/2002 | Ryu et al. |
| 6,511,694 | B2 | | 1/2003 | Huang et al. |
| 6,569,485 | B2 | | 5/2003 | Hussein |
| 2001/0005524 | A1 | | 6/2001 | Hussein |
| 2003/0003215 | A1 | | 1/2003 | Huang et al. |
| 2003/0031758 | A1 | | 2/2003 | Koss et al. |
| 2003/0207016 | A1 | | 11/2003 | Hussein |

OTHER PUBLICATIONS

Cole , C. Not Milk . . . NUTMILKS, Woodbridge Press, Santa Barbara,, CA 1990, pp. 57, 61-69, 71, 73-78.*
Cole, L. "Not Milk . . . Nut Milks", Woodbridge Press, Santa Barbara, CA ,1990, pp. 53, 57, 61, 73.*
Rogers, J., *Vice Cream Over 70 Sinfully Delicious Dairy-Free Delights*, Celestial Arts, California (2004).
Vegetarian Reading. [on-line] [retrieved on Dec. 20, 2005]. Retrieved from the Internet: <URL: www.vegparadise.com/vegreading66. html>.
FreeZees. [on-line] [retrieved on Dec. 20, 2005]. Retrieved from the Internet: <URL: www.freezees.com/productsprint.html>.
Klein's Kosher Ice Cream. [on-line] [retrieved on Dec. 20, 2005]. Retrieved from the Internet: <URL: www.koshericecream.com/product.asp?id=26&subid=&productID=198>.
First Glance and Oat Supreme Ice Cream—ingredients and nutritional information. [on-line] [retrieved on Dec. 20, 2005]. Retrieved from the Internet: <URL:www.first-foods.com/icecreamingred. htm>.
Rice Dream Non-Dairy Froxen Dessert. [on-line] [retrieved on Dec. 20, 2005]. Retrieved from the Internet: <URL: www.tastethedream. com/pages/products/ricedreamfrozen.php>.
VRG Journal Jul. 1993. [on-line] [retrieved on Dec. 20, 2005]. Retrieved from the Internet on Dec. 20, 2005. Retrieved from the Internet: <URL: www.vrg.org/journal/93jul.htm>.
Tofutti Premium Pints Vanilla. [on-line] [retrieved on Dec. 20, 2005]. Retrieved from the Internet: <URL: www.tofutti.com/pictures/pp_pp_vanilla_02.gif>.
Davis, et al, "*Dairy-free & delicious*," pp. 54, 56, 57, 64, 65 & 72, Book Publishing Co., (2001).
Eileen Kupstas Soo: Home Page, Recipes, *Misc. kids Frequently Asked Questions: Allergies and Asthma*, p. 35, University of North Carolina at Chapel Hill, Dept. of Computer Science, downloaded online @ http://www.cs.unc.edu/~kupstas/FAQ_recipes.html; accessed Sep. 20, 2006.

* cited by examiner

*Primary Examiner*—Helen F Pratt
(74) *Attorney, Agent, or Firm*—Winston & Strawn LLP; Richard P. Gilly

(57) ABSTRACT

A food product or composition has from about 23% to about 42% by weight of at least one of the group consisting of almonds and cashews, wherein the almonds and/or cashews have been finely ground, from about 27% to about 65% by weight of a liquefying agent capable of forming a cream when combined with the almonds and/or cashews, from about 10% to about 19% by weight of a sweetening agent, and from about 0.0003% to about 0.0005% by weight of salt. The composition is made by grinding from about 23% to about 42% by weight of at least one of the group consisting of almonds and cashews, and adding from about 27% to about 65% by weight of a liquefying agent to form a cream. To this cream is added from about 10% to about 19% by weight of a sweetening agent, and from about 0.0003% to about 0.0006% by weight of salt, to form a mixture, which may then be frozen.

30 Claims, No Drawings

US 7,592,030 B2

NON-DAIRY, NON-SOY FOOD PRODUCT AND METHODS OF MAKING

TECHNICAL FIELD

This invention relates to a food product.

Many adults suffer from lactose intolerance, which is defined as the inability to break down lactose, the main sugar found in dairy products, as a result of the lack of a specific digestive enzyme known as lactase. To manage this condition, many people seek non dairy-based foods that possess similar satisfying tastes and consistencies as traditional dairy-based foods. In addition to dairy, food products containing soy are well known, and many foods incorporate soy as an alternative to dairy. A food product which is also essentially free of soy would be a useful alternative for individuals wishing to avoid soy-based foods.

SUMMARY

In one embodiment, a food composition may be accomplished having from about 23% to about 42% by weight of at least one of the group consisting of almonds and cashews, from about 27% to about 65% by weight of a liquefying agent capable of forming a cream when combined with the almonds and/or cashews, from about 10% to about 19% by weight of a sweetening agent, and from about 0.0003% to about 0.0006% by weight of salt. The almonds and/or cashews may be a combination of almonds and cashews in a 1:1 ratio by weight. The liquefying agent may be water. The sweetening agent may be selected from the group consisting of sugar and xylitol crystals.

In another embodiment, a food composition may be accomplished having about 42% by weight of at least one of the group consisting of almonds and cashews, about 47% by weight of a liquefying agent capable of forming a cream when combined with the almonds and/or cashews, about 10.5% by weight of a sweetening agent, and about 0.00054% by weight of salt. The almonds and/or cashews may be a mixture of almonds and cashews combined in a 1:1 ratio. The liquefying agent may be water. The sweetening agent may be selected from the group consisting of sugar and xylitol crystals.

In another embodiment, a frozen, non-dairy, non-soy based dessert composition may be accomplished having about 42% by weight of almonds and cashews wherein the almonds and cashews have been finely ground, about 47% by weight of water, capable of forming a cream when combined with the almonds and cashews, about 10.5% by weight of a sweetening agent, and about 0.00054% by weight of salt. The almonds and cashews may be combined in a 1:1 ratio. The sweetening agent may be selected from the group consisting of sugar and xylitol crystals.

In yet another embodiment, a method for producing a food composition may be accomplished, including grinding from about 23% to about 42% by weight of at least one of the group consisting of almonds and cashews, and adding from about 27% to about 65% by weight of a liquefying agent to form a cream. To this cream is added from about 10% to about 19% by weight of a sweetening agent, and from about 0.0003% to about 0.0006% by weight of salt to form a mixture. The mixture may be frozen. The cream may be strained to remove particulate matter. The almonds and/or cashews that are ground may be a mixture of almonds and cashews combined in a 1:1 ratio. The liquefying agent that is added may be nearly-boiling water. The sweetening agent that is added may be selected from the group consisting of sugar and xylitol crystals.

In still another embodiment, a method for producing a food composition may be accomplished, including grinding about 42% by weight of at least one of the group consisting of almonds and cashews and adding about 47% by weight of a liquefying agent to form a cream. To this cream is added about 10.5% by weight of a sweetening agent, and about 0.00054% by weight of salt to form a mixture. The mixture may be frozen. The cream may be strained to remove particulate matter. The almonds and/or cashews that are ground may be a mixture of almonds and cashews combined in a 1:1 ratio. The liquefying agent that is added may be nearly-boiling water. The sweetening agent that is added may be selected from the group consisting of sugar and xylitol crystals.

In yet another embodiment, a method for making a frozen, non-dairy, non-soy based dessert composition may be accomplished, including grinding about 42% by weight of almonds and cashews and adding about 47% by weight of nearly-boiling water to form a cream. To this cream is added about 10.5% by weight of a sweetening agent, and about 0.00054% by weight of salt to form a mixture. The mixture may be frozen. The cream may be strained to remove particulate matter. The almonds and cashews that are ground may be a mixture of almonds and cashews combined in a 1:1 ratio. The sweetening agent that is added may be selected from the group consisting of sugar and xylitol crystals.

The details of one or more embodiments of the invention are set forth in the accompanying description below. Other features, objects, and advantages of the invention will be apparent from the description, and from the claims.

DETAILED DESCRIPTION

In general terms, the food compositions or products described herein make use of either finely ground almonds, finely ground cashews, or both, suitably combined with a liquefying agent (such as water), a sweetener, and salt to form a creamy base. In one implementation, the base is substantially free of particles of the almonds or cashews, giving it a "mouthfeel" which approximates dairy- or soy-based products. Additional flavorings of any variety can be added to the base to form any corresponding flavored food composition. The food composition is preferably frozen, and in another of its implementations, forms a frozen dessert composition, simulating ice-cream, frozen yoghurt, custard, or other dairy-based frozen and semi-frozen desserts, as well as soy-based alternatives to any of these.

In another implementation, the food composition herein contains substantially no dairy or other lactose-containing components. In yet another implementation, the food composition contains substantially no soy or soy-based components. In still another implementation, almonds and cashews together substitute substantially for both dairy and soy components, making a composition which is both substantially dairy- and lactose-free on the one hand, and also soy-free on the other hand.

As such, any of the implementations of the food product can be composed to be useful in the creation of a number of desirable food products, including, but not limited to, foods having a taste and consistency comparable to ice cream, frozen yogurt, and the like.

The cashew, botanically-known as *Anacardium occidentale*, is the seed of a tropical evergreen plant related to the mango, pistachio, and poison ivy. The almond is the ellipsoidal kernel of a tree (*Prunus dulcis*) which belongs to the same group of plants as the rose, plum, cherry and peach, and can be either eaten as a nut or used for extraction of an oil for flavoring. In one implementation, both almonds and cashews are used to form the base. It has been found that both almonds and cashews together (referred to herein as "the nut-seed component" of the composition) provide a sufficiently neutral-tasting base to which various flavorings can be added. This aspect is especially useful, since, for example, when sweeteners and additional flavorings are added, a wide variety of food products having a corresponding variety of flavors is created.

The nut-seed component can be between about 23% and about 42% by weight. The nut-seed component includes, but is not limited to, almonds and cashews, preferably blanched almonds and raw cashews. As used herein, the terms "blanched" and "raw" correspond to definitions familiar to those skilled in the relevant art. One preferred implementation makes use of substantially equal parts of liquefied almonds ("almond cream") and liquefied cashews ("cashew cream") to form the base. In those implementations where the nut-seed component is used to substantially replace dairy- or soy-based components in the base, the resulting food composition is a viable alternative for those who are lactose intolerant, or who wish to avoid products containing soy.

The liquefying agent contributes to smoothness and consistency, as varying the amount of added liquid can influence the viscosity of the final food product. The liquefying agent can be between about 27% and about 65% by weight. Any of a wide variety of liquefying agents may be used. Some examples, without limitation, may include pure filtered water, purified reverse-osmosis treated water, distilled water and tap water, milk, or milk substitutes.

In some implementations using water as the liquefying agent, the water is heated to between about 175 and about 190 degrees Fahrenheit, that is, "nearly boiling," and such nearly boiling water is combined with the almonds and/or the cashews.

The sweetening agent imparts a degree of satisfying flavor to the composition, and can be between about 10% and about 19% by weight. The sweetening agent includes, but is not limited to, sugar and sugar substitutes. Any of a wide variety of sugars may be used. Some examples, without limitation, may include pure cane sugar, evaporated cane sugar, evaporated cane juice, refined sugar, organic evaporated cane sugar, organic evaporated cane sugar, rice bran syrup, tapioca syrup, fructose syrup, crystallized fructose, and the like. Sugar substitutes include, without limitation, SPLENDA, xylitol crystals, and the like.

The salt used in the composition also contributes to flavoring characteristics, and can be between about 0.0003% and about 0.0006% by weight. Any of a wide variety of types of salt may be used.

A flavoring agent is added to the composition, generally in those applications where it is desired for the food composition to assume any of a variety of corresponding flavors. The amount of flavoring agent added can be between about 0.00032% and about 0.0019% by weight, which amount varies according to the type of flavoring agent used. Appealing, popular flavors suitable for the food composition, include, but are not limited to, vanilla extract, vanilla bean, chocolate, raw ground fresh fruit, hazelnut, mint extracts (peppermint, spearmint, wintergreen), lemon juice, lemon rind, orange juice, orange rind and shredded unsweetened coconut. Some examples of types of chocolate which can be used, without limitation, may include chocolate, cocoa, unsweetened chocolate, semi-sweet chocolate, bittersweet chocolate, cocoa mast, cocoa nibs, and unsweetened cocoa. Some examples of raw ground fresh fruit which can be used, without limitation, may include strawberries, peaches, raspberries, blueberries, blackberries, cloudberries, bananas, papayas, mangoes, nectarines and cherries.

In some implementations, the food composition is made by first grinding the almonds or cashews (separately or together) to a suitably fine size. Water is added to the almonds or cashews at any point before, during, or after grinding so as to "liquefy" the almonds and/or cashews sufficiently to form corresponding "cream." The cream is strained to remove particulate matter which otherwise would be discernible by "mouthfeel," so as to yield a smooth consistency to the almond cream and/or cashew cream. To form the base, the almond cream and the cashew cream are intermixed, if not already in such state by intermixing during the grinding step. The cream is mixed with a sweetening agent and salt. Various flavoring agents can then be added to the base, and the base may be further processed, including freezing or refrigeration.

The food composition may be processed in frozen form as a product that mimics the texture, flavor and consistency of traditional, dairy-based ice cream, frozen yoghurt, sorbet, custard, soy-based or other types of ice-cream substitutes, and the like.

EXAMPLES

The following non-limiting examples further illustrate different implementations of the food composition.

Example 1

| Ingredient | Amount |
| --- | --- |
| Raw cashews, organic preferred | 2 Cups |
| Blanched almonds, organic preferred | 2 Cups |
| Pure filtered water | 4 Cups |
| Kosher salt | ⅛ tsp |
| Pure evaporated cane sugar, organic preferred or xylitol crystals | ½ to ¾ Cup |

Two cups of raw organic cashews are finely ground in a food processor or juicer. The finely ground cashews are placed in a kitchen blender (such as Waring or Osterizer), and two cups of nearly boiling pure filtered water are added. The mixture is blended on high power for approximately one minute, or until a thick cream is produced, yielding approximately 4 cups of cream.

The cream is strained through two layers of fine "jelly bag" cloth to filter out particulate matter otherwise detectable by mouthfeel until only a smooth cream remains. Total yield is approximately 4 cups of cashew cream.

The above mixing and straining procedure is repeated using blanched almonds, to yield approximately 4 cups of almond cream.

One cup of cashew cream and one cup of almond cream are combined with ⅛ tsp kosher salt and approximately ½ to ¾ cup pure evaporated cane sugar to create the "ice cream" base from which all compositions proceed.

To this base may be added various flavoring agents; various non-limiting examples include vanilla extract, pure cocoa/ chocolate and raw ground fresh fruit, including strawberries and peaches, and shredded, unsweetened coconut.

Example 2

| Ingredient | Amount |
| --- | --- |
| Raw cashews, organic preferred | 4 Cups |
| Blanched almonds, organic preferred | 4 Cups |
| Purified (preferably reverse osmosis) water, heated to 175-190 degrees Fahrenheit | 12 Cups |
| Kosher salt | ⅛ tsp |
| Pure evaporated cane sugar, organic preferred or xylitol crystals | ½-¾ Cup |

Four cups whole blanched almonds are placed in the hopper/container of a Vita-Mix Whole Food Machine (Variable Speed model, manufactured by Vita-Mix Corporation, 8615 Usher Road, Cleveland, Ohio 44138), or any commercial or household blender that has a very high power blending capacity. Four cups of purified (preferably reverse-osmosis) water are added, and the mixture is pureed on Low Variable (I) power, setting #4 for 30 seconds. The setting is increased to #10, and the mixture is further blended for one minute. Two cups of the almond puree is removed and reserved in a separate container.

To the remaining two cups of almond puree remaining in the blender, two additional cups of purified water are added. The mixture is liquefied on High (II) Power, setting #0 for one minute. The resulting liquefied almond cream is poured into a storage container.

The reserved two cups of almond puree is retrieved and poured into the container of the Vita-Mix Blender. To this puree is added two cups of purified water, and the mixture is liquefied on High (II) Power, setting #0 for one minute. The resulting liquefied almond cream is poured into the same storage container holding the previously made liquefied almond cream and refrigerated. Total yield is 12 cups almond cream.

Four cups of whole raw cashews are placed in the hopper/container of a Vita-Mix Whole Food Machine (Variable Speed model, manufactured by Vita-Mix Corporation, 8615 Usher Road, Cleveland, Ohio 44138), or any commercial or household blender that has a very high power blending capacity. Four cups of purified (preferably reverse-osmosis) water are added, and the mixture is pureed on Low Variable (I) power, setting #4 for 30 seconds. The setting is increased to #10, and the mixture is further blended 30 seconds. The variable speed is dialed down to #0 and increased to High (II) Power, and the contents are liquefied for an additional one minute. The liquefied cashew cream is poured into a storage container and refrigerated. Total yield is 8 cups of cashew cream.

One cup of cashew cream and one cup of almond cream are combined with ⅛ tsp kosher salt and approximately ½ to ¾ cup pure evaporated cane sugar to create the "ice cream" base from which all compositions proceed.

To this base may be added various flavoring agents; various non-limiting examples include vanilla extract, pure cocoa/chocolate and raw ground fresh fruit, including strawberries and peaches, and shredded, unsweetened coconut.

A number of embodiments of the invention have been described. Nevertheless, it will be understood that various modifications may be made without departing from the spirit and scope of the invention. For example, the food product described herein may be processed to form resulting frozen desserts that vary in hardness and consistency, ranging from the more solid consistency of traditional ice cream to the softer consistency of frozen custard. Accordingly, other embodiments are within the scope of the following claims.

What is claimed is:

1. A food composition, consisting essentially of:
   about 42% by weight of blanched almonds and raw cashews in a substantially 1:1 ratio by weight;
   about 47% by weight of a liquefying agent, the liquefying agent, the almonds, and the cashews suitably combined to form a neutral-tasting base;
   about 10.5% by weight of a sweetening agent;
   about 0.0005% by weight of salt; and
   a flavoring agent, wherein the neutral-tasting base, the sweetening agent, the flavoring agent, and the salt are suitably combined to form a mixture.

2. The composition of claim 1, wherein the liquefying agent is water.

3. The composition of claim 1, wherein the sweetening agent is selected from the group consisting of sugar and sugar substitutes.

4. The composition of claim 1, wherein the food composition comprises a frozen composition.

5. The composition of claim 1, wherein the neutral-tasting base, the sweetening agent, and the salt are suitably combined to form a mixture for a frozen dessert composition, and further comprising a flavoring agent added to the mixture.

6. The composition of claim 5, wherein the flavoring agent is selected from the group consisting of vanilla, chocolate, fruit, nut, mint extracts, and coconut.

7. A neutral-taste food composition consisting essentially of, blanched almonds, raw cashews, and a liquefying agent, the liquefying agent, the almonds and the cashews suitably combined to form a neutral-tasting base, wherein the combination of the almonds and the cashews is substantially in a 1:1 ratio.

8. The neutral-taste food composition of claim 7, wherein the base has the consistency of dairy cream.

9. A non-soy, non-dairy food composition, consisting essentially of:
   the neutral-taste food composition of claim 8, salt, and a sweetening agent, wherein the food composition contains:
   from about 23% to about 42% by weight of blanched almonds and raw cashews;
   from about 27% to about 65% by weight of a liquefying agent;
   from about 10% to about 19% by weight of a sweetening agent;
   from about 0.0003% to about 0.0006% by weight of salt;
   substantially no soy-based components; and
   substantially no lactose-containing components.

10. The composition of claim 9, wherein the sweetening agent is selected from the group consisting of sugar and sugar substitutes.

11. The composition of claim 9, wherein the food composition comprises a frozen dessert composition and includes substantially no lactose-containing components.

12. The composition of claim 9, wherein the food composition comprises a frozen ice-cream substitute and includes substantially no lactose-containing components and substantially no soy-based components.

13. The composition of claim 9, wherein the almonds consist of blanched almonds and the cashews consist of raw cashews.

14. A frozen dessert composition, consisting essentially of:
- about 42% by weight of finely ground, blanched almonds and raw cashews, the almonds and the cashews in substantially equal parts by weight;
- about 47% by weight of water, the water, the almonds, and the cashews suitably combined and strained to form a neutral-tasting base substantially free of particles of the cashews and the almonds discernible by mouthfeel;
- about 10.5% by weight of a sweetening agent;
- about 0.00054% by weight of salt, wherein the neutral-tasting base, the sweetening agent, and the salt are suitably combined to form a mixture;
- a flavoring agent combined with the mixture;
- wherein the mixture is substantially free of lactose-containing components and substantially free of soy-based components.

15. The composition of claim 14, wherein the sweetening agent is selected from the group consisting of sugar and sugar substitutes.

16. A method for producing a frozen food composition, consisting essentially of the steps of:
- grinding from about 23% to about 42% by weight of a combination of blanched almonds and raw cashews is substantially in a 1:1 ratio by weight and adding from about 27% to about 65% by weight of a liquefying agent to form a neutral-tasting base consisting essentially of almonds, cashews, and a liquefying agent;
- adding to the neutral-tasting base to form a mixture:
    - from about 10% to about 19% by weight of a sweetening agent;
    - from about 0.0003% to about 0.006% by weight of salt; and freezing the mixture.

17. The method of claim 16, further comprising straining the neutral-tasting base to remove particulate matter discernible by mouthfeel.

18. The method of claim 16, wherein the grinding step further comprises grinding almonds to form a corresponding almond cream and grinding cashews to form a corresponding cashew cream, and further comprising the step of combining substantially equal parts of the cashew cream and the almond cream.

19. The method of claim 18, wherein the step of adding the liquefying agent comprises the step of adding nearly boiling water during the grinding.

20. The method of claim 19, further comprising the step of adding a flavoring agent to the mixture to form a frozen dessert composition.

21. A method for producing a food composition, consisting essentially of the steps of:
- grinding blanched almonds;
- adding a liquefying agent before, during, or after the grinding step to form a corresponding almond cream;
- grinding raw cashews;
- adding a liquefying agent before, during, or after the grinding step to form a corresponding cashew cream;
- combining the cashew cream and the almond cream in substantially a 1:1 ratio to form a neutral-tasting base;
- adding to the neutral-tasting base to form a mixture:
    - about 10.5% by weight of a sweetening agent;
    - about 0.00054% by weight of salt; and
- freezing the mixture.

22. The method of claim 21, further comprising straining the neutral-tasting base to remove particulate matter discernible by mouthfeel.

23. The method of claim 22, wherein the steps of adding a liquefying agent comprise adding nearly-boiling water.

24. The method of claim 23, further comprising adding a sweetening agent selected from the group consisting of sugar and sugar substitutes.

25. A method of making a frozen dessert composition, consisting essentially of the steps of:
- grinding about 42% by weight of blanched almonds and raw cashews in a substantially 1:1 ratio by weight;
- adding about 47% by weight of nearly-boiling water to the almonds and cashews to form a neutral-tasting base;
- adding to the neutral-tasting base to form a mixture:
    - about 10.5% by weight of a sweetening agent;
    - about 0.00054% by weight of salt;
- freezing the mixture.

26. The method of claim 25, further comprising straining the neutral-tasting base to remove particulate matter discernible by mouthfeel.

27. The method of claim 25, wherein the almonds and cashews are ground separately and the water is added to form a separate, corresponding almond cream and a corresponding cashew cream, and further comprising the step of combining the almond and the cashew creams together to form a nut-seed component to the base.

28. The method of claim 27, wherein the step of combining the almond and the cashew creams together includes the step of combining substantially equal parts of the almond and cashew creams.

29. The method of claim 25, wherein the almonds and the cashews are ground together and the water is added to the almonds and the cashews to form a nut-seed component.

30. The method of claim 25, further comprising adding a sweetening agent selected from the group consisting of sugar and sugar substitutes.

* * * * *

UNITED STATES PATENT AND TRADEMARK OFFICE
CERTIFICATE OF CORRECTION

PATENT NO. : 7,592,030 B2 Page 1 of 1
APPLICATION NO. : 11/071077
DATED : September 22, 2009
INVENTOR(S) : Rose Anne Jarrett It is certified that error appears in the above-identified patent and that said Letters Patent is hereby corrected as shown below:

Title Page:
Item (56) References Cited, OTHER PUBLICATIONS, after "Rice Dream Non-Dairy" change "Froxen" to -- Frozen --.

Signed and Sealed this

Second Day of February, 2010

David J. Kappos
*Director of the United States Patent and Trademark Office*

UNITED STATES PATENT AND TRADEMARK OFFICE
CERTIFICATE OF CORRECTION

PATENT NO. : 7,592,030 B2  Page 1 of 1
APPLICATION NO. : 11/071077
DATED : September 22, 2009
INVENTOR(S) : Jarrett It is certified that error appears in the above-identified patent and that said Letters Patent is hereby corrected as shown below:

On the Title page,

[*] Notice: Subject to any disclaimer, the term of this patent is extended or adjusted under 35 USC 154(b) by 561 days Delete the phrase "by 561 days" and insert -- by 1055 days --

Signed and Sealed this

Sixth Day of April, 2010

David J. Kappos
*Director of the United States Patent and Trademark Office*